US009926446B2

(12) United States Patent
Harada

(10) Patent No.: US 9,926,446 B2
(45) Date of Patent: Mar. 27, 2018

(54) PHENOLIC RESIN COMPOSITION FOR FRICTION MATERIAL, FRICTION MATERIAL, AND BRAKE

(71) Applicant: SUMITOMO BAKELITE CO., LTD., Tokyo (JP)

(72) Inventor: Naoyuki Harada, Tokyo (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 98 days.

(21) Appl. No.: 15/115,177

(22) PCT Filed: Jan. 27, 2015

(86) PCT No.: PCT/JP2015/052198
§ 371 (c)(1),
(2) Date: Jul. 28, 2016

(87) PCT Pub. No.: WO2015/118996
PCT Pub. Date: Aug. 13, 2015

(65) Prior Publication Data
US 2016/0347949 A1    Dec. 1, 2016

(30) Foreign Application Priority Data
Feb. 7, 2014    (JP) ................... 2014-022070

(51) Int. Cl.
C08L 61/06 (2006.01)
F16D 69/02 (2006.01)
C08G 8/10 (2006.01)
C08G 8/22 (2006.01)
C08J 3/20 (2006.01)
F16D 69/00 (2006.01)

(52) U.S. Cl.
CPC ............ C08L 61/06 (2013.01); C08G 8/10 (2013.01); C08G 8/22 (2013.01); C08J 3/203 (2013.01); F16D 69/026 (2013.01); C08J 2361/06 (2013.01); C08L 2201/08 (2013.01); C08L 2205/025 (2013.01); C08L 2205/03 (2013.01); F16D 2069/001 (2013.01)

(58) Field of Classification Search
CPC ........................................................ C08L 61/06
USPC ........................................................ 523/156
See application file for complete search history.

(56) References Cited

U.S. PATENT DOCUMENTS 6,664,343 B2 * 12/2003 Narisawa ............... C08L 61/06
525/474
2002/0006981 A1 * 1/2002 Nakamura ............ B29C 43/006
523/155

FOREIGN PATENT DOCUMENTS

| JP | 64-74232 A | 3/1989 |
|----|------------|--------|
| JP | 2-303806 A | 12/1990 |
| JP | 11-71497 A | 3/1999 |
| JP | 11-209451 A | 8/1999 |
| JP | 11-323314 A | 11/1999 |
| JP | 2005-272548 | * 10/2005 |
| JP | 2005-272548 A | 10/2005 |
| JP | 2006-257136 A | 9/2006 |

OTHER PUBLICATIONS

Derwent Abstract of JP 2005-272548, 2005.*
International Search Report dated Apr. 21, 2015, issued in counterpart International Application No. PCT/JP2015/052198 (2 pages).

* cited by examiner

Primary Examiner — Doris L Lee
(74) Attorney, Agent, or Firm — Westerman, Hattori, Daniels & Adrian, LLP

(57) ABSTRACT

A phenolic resin composition for friction materials includes a high-ortho novolac phenolic resin, a novolac resorcinol resin, and hexamethylenetetramine.

14 Claims, No Drawings

PHENOLIC RESIN COMPOSITION FOR FRICTION MATERIAL, FRICTION MATERIAL, AND BRAKE

TECHNICAL FIELD

The present invention relates to a phenolic resin composition for friction materials, a friction material, and a brake.

BACKGROUND ART

Phenolic resin compositions are materials having excellent heat resistance and adhesiveness to inorganic fillers and are widely used as binders for friction materials such as brakes. Specific examples of phenolic resin compositions that are generally used as the above-described binders for friction materials include powder-form thermosetting phenolic resin compositions obtained by grinding and mixing a random novolac phenolic resin and hexamethylenetetramine and the like.

In typical processes of the related art for manufacturing friction materials such as brakes for which a phenolic resin composition is used, a resin mixture obtained by mixing a fibrous inorganic filler base material such as glass fibers, aramid fibers, or metal fibers, a powder-form inorganic filler such as calcium carbonate or barium sulfate, or the like with a thermosetting phenolic resin composition which is used as a binder is heated, pressurized, and molded using a hot press device, thereby producing compacts.

In addition, thus far, there has been a demand for the above-described binders for friction materials to have characteristics such as a high strength, heat resistance, wear resistance, a high coefficient of friction, a low noise, low moisture absorption properties, and high vibration absorption properties. Particularly, in recent years, in order to increase the productivity of friction materials, there has been a demand for improving the curing properties of phenolic resin compositions for friction materials. In order to satisfy the above-described demands, a variety of studies have thus far been performed regarding phenolic resin compositions for friction materials.

For example, Patent Document 1 discloses a technique in which, in order to improve the curing properties of phenolic resin compositions for friction materials, a high-ortho novolac phenolic resin is used as a novolac phenolic resin, an acidic substance is added in order to increase the decomposition rate of hexamethylenetetramine, and a high-ortho novolac phenolic resin and hexamethylenetetramine are made to become an adduct by means of melting and kneading.

RELATED DOCUMENT

Patent Document

[Patent Document 1] Japanese Unexamined Patent Publication No. 2005-272548

SUMMARY OF THE INVENTION

Since the related art described in Patent Document 1 and the like is capable of shortening the gelation time, it may be expected that there will be an effect of shortening the time necessary for press steps to a certain extent. However, the present inventor found that, in the above-described related art, the strength or hardness of compacts is low, and thus a sufficient degree of mechanical characteristics cannot be obtained, creating room for improvement.

Therefore, the present invention provides a phenolic resin composition for friction materials capable of reaching a high degree of cure even when the curing time is shortened, whereby friction materials having excellent heat resistance can be obtained without any deterioration of their characteristics such as mechanical characteristics.

According to the present invention, there is provided a phenolic resin composition for friction materials including: a high-ortho novolac phenolic resin; a novolac resorcinol resin; and hexamethylenetetramine.

Furthermore, according to the present invention, there is provided a friction material including: a fibrous base material; a filler; and a binding material, in which the binding material includes the phenolic resin composition for friction materials.

Furthermore, according to the present invention, there is provided a brake formed using the friction material.

According to the present invention, it is possible to provide a phenolic resin composition for friction materials capable of reaching a high degree of cure even when the curing time is shortened, whereby friction materials having excellent heat resistance can be obtained without any deterioration of a variety of characteristics such as mechanical characteristics deteriorating.

DESCRIPTION OF EMBODIMENTS

<Phenolic resin composition for friction materials>

A phenolic resin composition for friction materials according to the present embodiment includes a high-ortho novolac phenolic resin, a novolac resorcinol resin, and hexamethylenetetramine. Therefore, it is possible to produce a phenolic resin composition for friction materials capable of realizing a high degree of cure even when the curing time is shortened.

For the phenolic resin composition for friction materials according to the present embodiment, three components of a high-ortho novolac phenolic resin, a novolac resorcinol resin, and hexamethylenetetramine are jointly used, and the phenolic resin composition is intended to be used as a raw material for manufacturing friction materials. According to the phenolic resin composition for friction materials according to the present embodiment, the above-described three components are used in combination, and thus, even when the phenolic resin composition is molded at a high temperature in order to manufacture friction materials, it is possible to maintain the balance between the curing properties and the degassing properties of the resin composition in a favorable state. Therefore, the use of the phenolic resin composition for friction materials according to the present embodiment enables friction materials to be molded within a short period of time. Therefore, it is possible to significantly decrease the manufacturing costs of friction materials.

The phenolic resin composition for friction materials according to the present embodiment preferably includes a resin mixture of a high-ortho novolac phenolic resin and a novolac resorcinol resin as a resin component. In such a case, it is possible to significantly improve the degree of cure in a case in which the curing time is shortened.

The content of the novolac resorcinol resin is preferably higher than or equal to 1 part by mass and lower than or equal to 100 parts by mass, more preferably higher than or equal to 3 parts by mass and lower than or equal to 85 parts by mass, and most preferably higher than or equal to 4 parts by mass and lower than or equal to 50 parts by mass with respect to 100 parts by mass of the high-ortho novolac phenolic resin. When the content of the novolac resorcinol resin is set to be higher than or equal to the above-described lower limit value, it becomes possible to reliably increase the degree of cure in a case in which the curing time is shortened. In addition, when the content of the novolac resorcinol resin is set to be lower than or equal to the above-described upper limit value, it is possible to prevent the deterioration of molding properties.

The high-ortho novolac phenolic resin according to the present embodiment is obtained by reacting a phenol and an aldehyde in the presence of an acidic catalyst. In the high-ortho novolac phenolic resin, the ratio (ortho/para bonding ratio) of the bonding positions of methylene groups or substituted methylene groups derived from the aldehyde to phenolic hydroxyl groups in the phenol is preferably higher than or equal to 1 and lower than or equal to 9, and, from the viewpoint of ease of manufacturing, the ratio is more preferably higher than or equal to 2 and lower than or equal to 7, and most preferably higher than or equal to 2.5 and lower than or equal to 7. When the ratio is set as described above, it is possible to produce resin compositions having a faster curing rate than random novolac phenolic resins of the related art. Therefore, it is possible to shorten the molding time during the manufacturing of friction materials for which the phenolic resin composition for friction materials according to the present embodiment is used. In addition, in order to synthesize high-ortho novolac phenolic resins having the ortho/para bonding ratio in the above-described numeric range, it is important to control factors such as the reaction temperature and the reaction time. However, as the high-ortho novolac phenolic resin, commercially available products prepared so as to have the above-described ortho/para bonding ratio may be used.

The ortho/para bonding ratio of the high-ortho novolac phenolic resin can be calculated from the values of absorbance at a wave number of 760 $cm^{-1}$ and a wave number of 820 $cm^{-1}$ when measured using an infrared absorption spectrum method. Specifically, the ortho/para bonding ratio can be calculated using the following equation. Meanwhile, in the following equation, D760 represents absorbance at 760 $cm^{-1}$, and D820 represents absorbance at 820 $cm^{-1}$.

Ortho/para bonding ratio=$D760/(1.44 \times D820)$     Equation:

Specific examples of the phenol that is used in the synthesis of the high-ortho novolac phenolic resin include phenols such as phenol, ortho-cresol, meta-cresol, para-cresol, xylenol, para-tertiary butylphenol, para-octylphenol, para-phenylphenol, bisphenol A, bisphenol F, and resorcinol. These phenols may be used alone, or two or more phenols may be used in combination. Among these, from the viewpoint of manufacturing costs and molding properties, phenol or cresol is preferably used.

Specific examples of the aldehyde that is used in the synthesis of the high-ortho novolac phenolic resin include aldehydes such as formaldehyde, para-formaldehyde, acetaldehyde, butyl aldehyde, and acrolein, mixtures thereof, substances serving as generation sources of the above-described aldehydes, solutions of the above-described aldehydes, and the like. Among these, from the viewpoint of manufacturing costs and molding properties, formaldehyde is preferably used.

Examples of the forms of the high-ortho novolac phenolic resin and the novolac resorcinol resin include a variety of forms such as a liquid form, a solid form, and a powder form, and, among these, from the viewpoint of handling properties, a solid form is preferred.

The high-ortho novolac phenolic resin is preferably a resin controlled so that the reaction molar ratio (F/P) of the aldehyde (F) to the phenol (P) falls in a range of higher than or equal to 0.5 and lower than or equal to 0.9. In such a case, the resin does not turn into gel during reactions, and it is possible to synthesize high-ortho resins having a preferred molecular weight. When the reaction molar ratio is higher than or equal to the above-described lower limit value, it is possible to reduce the amount of unreacted phenols contained in the high-ortho resins to be obtained. In addition, when the reaction molar ratio is lower than or equal to the above-described upper limit value, it is possible to suppress the gelation of resins due to reaction conditions.

The weight-average molecular weight of the high-ortho novolac phenolic resin is preferably greater than or equal to 1,000 and more preferably greater than or equal to 2,000. In such a case, it is possible to improve the glass transition temperature when the curing time is shortened. In addition, the upper limit value of the weight-average molecular weight of the high-ortho novolac phenolic resin is preferably lower than or equal to 8,000 from the viewpoint of molding properties.

Examples of the acidic catalyst that is used in the reaction of the high-ortho novolac phenolic resin include compounds containing divalent metal ions when dissolved in phenol, and specific examples thereof include zinc acetate, lead naphthenate, and the like.

Next, the novolac resorcinol resin according to the present embodiment is, for example, a resin obtained by reacting a resorcinol and an aldehyde in the presence of an acidic catalyst and then removing water by means of a dehydration step.

Specific examples of the resorcinol that is used in the synthesis of the novolac resorcinol resin include resorcinol, methyl resorcinols such as 2-methyl resorcinol, 5-methyl resorcinol, and 2,5-dimethyl resorcinol, 4-ethyl resorcinol, 4-chlororesorcinol, 2-nitroresorcinol, 4-bromoresorcinol, 4-n-hexylresorcinol, and the like. These resorcinols may be used alone, or two or more resorcinols may be used in combination. Among these, from the viewpoint of manufacturing costs and molding properties, the resorcinol is preferably one or more selected from the group consisting of resorcinol and methyl resorcinols.

Specific examples of the aldehyde that is used in the synthesis of the novolac resorcinol resin include aldehydes such as formaldehyde, para-formaldehyde, acetaldehyde, butyl aldehyde, and acrolein, mixtures thereof, substances serving as generation sources of the above-described aldehydes, solutions of the above-described aldehydes, and the like. Among these, from the viewpoint of manufacturing costs and molding properties, formaldehyde is preferably used.

Specific examples of the acidic catalyst that is used in the synthesis of the novolac resorcinol resin include acids such as oxalic acid, hydrochloric acid, sulfuric acid, diethyl sulfate, and para-toluenesulfonic acid. These acidic catalysts may be used alone, or two or more acidic catalysts may be used in combination. In addition, since resorcinol itself is acidic, the synthesis reaction of the novolac resorcinol resin may be carried out in the absence of the catalyst.

In the synthesis of the novolac resorcinol resin, regarding the reaction molar ratio between the resorcinol and the aldehyde, it is preferable to use higher than or equal to 0.40 moles and lower than or equal to 0.80 moles of the aldehyde with respect to 1 mole of the resorcinol, and it is more preferable to use higher than or equal to 0.45 moles and lower than or equal to 0.75 moles of the aldehyde with respect to 1 mole of the resorcinol. When the reaction molar ratio between the resorcinol and the aldehyde is higher than or equal to the above-described lower limit value, the handling properties of resins are improved. When the reaction molar ratio between the resorcinol and the aldehyde is lower than or equal to the above-described upper limit value, it becomes easy to control the synthesis reaction of the novolac resorcinol resin.

The phenolic resin composition for friction materials according to the present embodiment includes hexamethylenetetramine as a curing agent. From the viewpoint of improving the reactivity between the high-ortho novolac phenolic resin and the novolac resorcinol resin, this hexamethylenetetramine is preferably included in the phenolic resin composition for friction materials according to the present embodiment in a form of an adduct forming an intermolecular adduct of the hexamethylenetetramine with the high-ortho novolac phenolic resin, that is, an adduct compound.

The proportion of hexamethylenetetramine forming the adduct in the total amount of the hexamethylenetetramine, that is, the adduct-forming percentage is preferably higher than or equal to 30% and more preferably higher than or equal to 32%. When the adduct-forming percentage of the hexamethylenetetramine is set to be higher than or equal to the above-described numeric range, it is possible to decrease the intermolecular distance between the high-ortho novolac phenolic resin, the novolac resorcinol resin, and the hexamethylenetetramine, and consequently, it is possible to improve the reactivity between the hexamethylenetetramine and the high-ortho novolac phenolic resin and the novolac resorcinol resin.

Here, the hexamethylenetetramine forming the adduct refers to hexamethylenetetramine that is not extracted by means of ion exchange water at 25±1° C. Generally, hexamethylenetetramine that has been simply grinded and mixed into phenolic resins is easily extracted with water. On the other hand, in hexamethylenetetramine forming adducts, that is, hexamethylenetetramine that is finely dispersed in phenolic resins, each of the miniaturized particles is included in phenolic resins and is thus not extracted with water. In addition, the adduct-forming percentage of the hexamethylenetetramine (the proportion of hexamethylenetetramine forming the adduct) can be obtained from the following equation. Meanwhile, in the following equation, A represents the mass of the entire hexamethylenetetramine which is obtained using the Kjeldahl method, a liquid chromatography method, an element analysis method, or the like, and B represents the mass of hexamethylenetetramine extracted with ion-exchange water which is obtained using a titration method. In addition, in the measurement, the particle diameter of the specimen is set to be smaller than or equal to 150 μm, and, in a case in which the particle diameters are coarse, the measurement is conducted after the specimen is grinded to a particle diameter of smaller than or equal to 150 μm.

$$\text{Adduct-forming percentage}=[(A-B)/A]\times 100(\%)$$

In the phenolic resin composition for friction materials according to the present embodiment, regarding the content of the hexamethylenetetramine, when the total value of the content of the high-ortho novolac phenolic resin and the content of the novolac resorcinol resin in the same resin composition is set to 100 parts by mass, the content is preferably higher than or equal to 5 parts by mass and lower than or equal to 20 parts by mass and more preferably higher than or equal to 7 parts by mass and lower than or equal to 18 parts by mass with respect to the above-described total value of 100 parts by mass. When the content of the hexamethylenetetramine is set to be higher than or equal to the above-described lower limit value, it becomes possible to obtain the minimum crosslinking density. In addition, when the content of the hexamethylenetetramine is set to be lower than or equal to the above-described upper limit value, it is possible to reduce the amount of gas generated during molding.

In the phenolic resin composition for friction materials according to the present embodiment, the content of free phenol is preferably lower than 1% by mass and more preferably lower than 0.9% by mass. When the content of free phenol is set to be lower than or equal to the above-described upper limit value, it becomes possible to suppress phenol components being volatilized, and it is possible to form favorable operation environments. Meanwhile, the content of free phenol in the phenolic resin composition for friction materials can be reduced by carrying out treatment such as the removal of the free phenol under a high vacuum condition in production stages of phenolic resins which are one of manufacturing raw materials.

The phenolic resin composition for friction materials according to the present embodiment has a maximum torque of preferably higher than or equal to 1 N·m and lower than or equal to 20 N·m when cured at 150° C. In such a case, it is possible to realize phenolic resin compositions for friction materials having excellent shaping properties. Furthermore, according to phenolic resin compositions for friction materials having a maximum torque in the above-described range, it is possible to reduce the amount of gas generated from the inside when friction materials are shaped using the resin compositions, and thus it is possible to suppress cracking or swelling occurring in produced friction materials. Meanwhile, the maximum torques of phenolic resin compositions for friction materials can be measured using a torque measurement instrument, for example, using the following method. The increase in the viscosity of the resin composition resulting from a reaction for melting and curing the phenolic resin composition for friction materials in a dice set to 150° C. is detected using the value of electric currents acting on a motor. The maximum value of electric currents detected in the above-described manner is used as the maximum torque when the resin composition is cured at 150° C.

Meanwhile, to the phenolic resin composition for friction materials according to the present embodiment, organic acids such as tartaric acid, succinic acid, malonic acid, fumaric acid, benzoic acid, and phthalic acid, random novolac phenolic resins, resorcinol phenolic resins, resorcinol monomers, and the like may be added in addition to the components described above as long as the object of the present invention is not impaired. Among these, in a case in which organic acids are added thereto, it is possible to improve the rapid curing properties of phenolic resin compositions for friction materials.

<Method for manufacturing phenolic resin composition for friction materials>

The phenolic resin composition for friction materials according to the present embodiment can be obtained using, for example, a method in which a high-ortho novolac phenolic resin, a novolac resorcinol resin, and hexamethylenetetramine are melted and mixed together. In a case in which this method is employed, a resin mixture of the high-ortho novolac phenolic resin and the novolac resorcinol resin may be used. Meanwhile, the above-described melting and mixing refers to the fact that the high-ortho novolac phenolic resin, the novolac resorcinol resin, and the hexamethylenetetramine are respectively melted to be in fluidized states and are mixed together in a state in which a curing reaction of the high-ortho novolac phenolic resin caused by the hexamethylenetetramine is not substantially caused. A specific melting and mixing method is preferably a method in which a predetermined amount of the high-ortho novolac phenolic resin, the novolac resorcinol resin, and the hexamethylenetetramine are prepared in a mixing device and are melted and mixed together. In addition, the melting and mixing temperature is preferably a temperature under which the high-ortho novolac phenolic resin is melted, but the curing reaction does not initiate. Examples of the mixing device include pressure kneaders such as pressure kneaders, biaxial extruders, and monoaxial extruders.

Here, in a case in which the high-ortho novolac phenolic resin, the novolac resorcinol resin, and the hexamethylenetetramine are mixed using an ordinary reaction container, disadvantages such as an increase in the resin viscosity or the progress of gelation reactions are caused, and thus it is difficult to stably mix the components. However, in a case in which the above-described pressure-type kneading devices are used, it is possible to make the dispersion state of the hexamethylenetetramine in the high-ortho novolac phenolic resin and the novolac resorcinol resin favorable, and it becomes possible to form adducts of the hexamethylenetetramine. Specifically, when the high-ortho novolac phenolic resin, the novolac resorcinol resin, and the hexamethylenetetramine are mixed together using the pressure-type kneading devices, it is possible to prepare phenolic resin composition for friction materials in which the proportion of adducts in the total amount of the hexamethylenetetramine, that is, the adduct-forming percentage reaches higher than or equal to 30%.

<Friction material>

A friction material according to the present embodiment is manufactured by mixing a fibrous base material, a filler, and a binding material including the above-described phenolic resin composition for friction materials and thermally shaping the obtained mixture as a raw material composition. Therefore, it is possible to obtain friction materials having excellent heat resistance without a variety of characteristics deteriorating.

Specific examples of the fibrous base material that is added to the friction material of the present embodiment include inorganic fibers such as steel fibers, copper fibers, glass fibers, ceramic fibers, and potassium titanate fibers and organic fibers such as aramid fibers. These fibrous base materials may be used alone, or two or more fibrous base materials may be used in combination. Among these, the friction material preferably includes organic fibers such as aramid fibers.

Specific examples of the filler that is added to the friction material of the present embodiment include inorganic fillers such as calcium carbonate, calcium hydroxide, barium sulfate, mica, abrasives, kaolin, and talc, organic fillers such as cashew dust and rubber dust, and lubricating materials such as graphite, antimony trisulfide, molybdenum disulfide, and zinc disulfide. These fillers may be used alone, or two or more fillers may be used in combination. Among these, inorganic fillers are preferably used.

The friction material according to the present embodiment can be produced using, for example, the following method. However, a method for manufacturing the friction material according to the present embodiment is not limited to the following example.

First, powder-form raw materials including the fibrous base material and the filler and a bonding material are weighed so as to reach a predetermined composition proportion, and the components are mixed together using a mixer. Meanwhile, specific examples of the mixer include ordinary mixers such as an Eirich mixer. Next, a predetermined amount of a raw material composition obtained by means of mixing is taken, and preliminary molding for producing a block body is carried out. After that, the obtained preliminary compact is injected into, for example, a mold heated to 150° C. and is pressurized for approximately 3 minutes to 7 minutes, thereby producing a compact. Next, the produced compact is cured by means of, for example, a thermal treatment at a temperature of higher than or equal to 200° C. for approximately one hour, whereby the friction material according to the present embodiment can be obtained.

Here, the friction material according to the present embodiment is used in order to form friction components such as brakes.

Meanwhile, the present invention is not limited to the above-described embodiment, and the present invention that is modified, improved, or the like is also included in the scope of the present invention as long as the object of the present invention can be achieved.

EXAMPLES

Hereinafter, the present invention will be described using examples and comparative examples, but the present invention is not limited thereto. In addition, "parts" and "%" mentioned in the examples and the comparative examples all represent "parts by mass" and "% by mass". Meanwhile, the weight-average molecular weight (Mw) of the high-ortho novolac phenolic resin obtained by means of the synthesis of the high-ortho novolac phenolic resin was measured by means of the gel permeation chromatography (GPC) of a tetrahydrofuran (THF)-soluble component and was computed in terms of polystyrene.

The measurement conditions of GPC are as described below.

Device: HLC-8320 (manufactured by Tosoh Corporation)
Detector: RI
Column: One row of TSK-GEL G1000 (manufactured by Tosoh Corporation) and two rows of TSK-GEL G2000H (manufactured by Tosoh Corporation) were coupled together in series in this order and were used.
Temperature: 40° C.
Solvent: THF
Flow rate: 1.0 ml/minute
Specimen: A specimen having a concentration of 1% by weight (50 μl) was injected In addition, the contents of free phenol in high-ortho novolac phenolic resins obtained in the syntheses of the high-ortho novolac phenolic resins are computed by measuring the obtained phenolic resins using a gas chromatograph "GC-2014" manufactured by Shimadzu Corporation and a column "DB-WAX" manufactured by Agilent Technologies.

Furthermore, the ortho/para bonding ratios of the high-ortho novolac phenolic resins obtained in the syntheses of the high-ortho novolac phenolic resins were measured using an infrared absorption spectrum method. The ortho/para bonding ratios were computed using the following equation from the values of absorbance at a wave number of 760 $cm^{-1}$ and a wave number of 820 $cm^{-1}$ when a KBr method was carried out using an FT-IR device (manufactured by Thermo Nicolet, Avatar 320). In the following equation, D760 represents absorbance at 760 cm$^{-1}$, and D820 represents absorbance at 820 cm$^{-1}$.

Equation:
$$\text{Ortho/para bonding ratio} = D760/(1.44 \times D820)$$

Syntheses of High-ortho Novolac Phenolic Resins

Resin Synthesis Example 1

A mixture of phenol (1,000 parts), 37% formalin (600 parts), and zinc acetate (2 parts) was reacted at 100° C. for three hours, then, was dehydrated by means of atmospheric distillation until the temperature of the reaction mixture reached 140° C., and was dehydrated by means of distillation under reduced pressure until the temperature of the reaction mixture reached 180° C. while gradually reducing the pressure to 0.9 kPa, and monomers were removed, thereby obtaining a high-ortho novolac phenolic resin A (1,000 parts). The high-ortho novolac phenolic resin A had a weight-average molecular weight of 6,000 and a content of free phenol of 0.6%. In addition, the high-ortho novolac phenolic resin A had an ortho/para bonding ratio of 5.7 and an F/P of 0.70.

Resin Synthesis Example 2

A mixture of phenol (1,000 parts), 37% formalin (550 parts), and zinc acetate (2 parts) was reacted at 100° C. for two and a half hours, then, was dehydrated by means of atmospheric distillation until the temperature of the reaction mixture reached 140° C., and furthermore, was dehydrated by means of distillation under reduced pressure until the temperature of the reaction mixture reached 180° C. while gradually reducing the pressure to 0.9 kPa, and monomers were removed, thereby obtaining a high-ortho novolac phenolic resin B (950 parts). The high-ortho novolac phenolic resin B had a weight-average molecular weight of 4,000 and a content of free phenol of 0.7%. In addition, the high-ortho novolac phenolic resin B had an ortho/para bonding ratio of 4.1 and an F/P of 0.64.

Resin Synthesis Example 3

A mixture of phenol (1,000 parts), 37% formalin (500 parts), and zinc acetate (2 parts) was reacted at 95° C. for three hours, then, was dehydrated by means of atmospheric distillation until the temperature of the reaction mixture reached 140° C., and furthermore, was dehydrated by means of distillation under reduced pressure until the temperature of the reaction mixture reached 180° C. while gradually reducing the pressure to 0.9 kPa, and monomers were removed, thereby obtaining a high-ortho novolac phenolic resin C (900 parts). The high-ortho novolac phenolic resin C had a weight-average molecular weight of 2,000 and a content of free phenol of 0.7%. In addition, the high-ortho novolac phenolic resin C had an ortho/para bonding ratio of 2.5 and an F/P of 0.58.

Synthesis of Novolac Phenolic Resin

A mixture of phenol (1,000 parts), 37% formalin (570 parts), and oxalic acid (10 parts) was reacted at 100° C. for three hours, then, was dehydrated by means of atmospheric distillation until the temperature of the reaction mixture reached 140° C., and furthermore, was dehydrated by means of distillation under reduced pressure until the temperature of the reaction mixture reached 200° C. while gradually reducing the pressure to 0.9 kPa, and monomers were removed, thereby obtaining a novolac phenolic resin D (910 parts). The novolac phenolic resin D had a weight-average molecular weight of 9,000 and a content of free phenol of 0.3%. In addition, the novolac phenolic resin D had an ortho/para bonding ratio of 0.8 and an F/P of 0.66.

Synthesis of Novolac Resorcinol Resin

A mixture of resorcinol (1,000 parts) and oxalic acid (3 parts) was heated so as to reach 100° C., and 37% formalin (400 parts) was added thereto over 30 minutes. After that, the components were reacted together for one hour, and the reaction mixture was dehydrated by means of atmospheric distillation until the temperature of the reaction mixture reached 140° C., and furthermore, was dehydrated by means of distillation under reduced pressure until the temperature of the reaction mixture reached 180° C. while gradually reducing the pressure to 0.9 kPa, and monomers were removed, thereby obtaining a novolac resorcinol resin E (910 parts).

Examples 1-1 to 1-6 and Comparative Examples 1-1 to 1-5

Phenolic resin compositions were produced using the following method and were evaluated using an evaluation method described below. The results are summarized in Table 1.

Production of Phenolic Resin Composition

Example 1-1

The high-ortho novolac phenolic resin A (800 parts), the novolac resorcinol resin E (200 parts), and hexamethylenetetramine (120 parts) were supplied to a biaxial extruder controlled to have an inlet temperature of 80° C. and an outlet temperature of 90° C. so that the supplying ratios thereof per unit time became equal, and the kneaded substance discharged through the outlet was cooled, thereby obtaining a phenolic resin composition A (with an adduct-forming percentage of hexamethylenetetramine of 40% and a content of free phenol of 0.5%) having a solid form at room temperature.

Example 1-2

The high-ortho novolac phenolic resin B (900 parts), the novolac resorcinol resin E (100 parts), and hexamethylenetetramine (130 parts) were injected into a pressure kneader, were heated to 90° C., and were dissolved for ten minutes. A phenolic resin composition B (with an adduct-forming percentage of hexamethylenetetramine of 69% and a content of free phenol of 0.6%) having a solid form at room temperature was obtained.

Example 1-3

The high-ortho novolac phenolic resin C (950 parts), the novolac resorcinol resin E (50 parts), and hexamethylenetetramine (150 parts) were supplied to a biaxial extruder controlled to have an inlet temperature of 85° C. and an outlet temperature of 95° C. so that the supply ratios thereof per unit time became equal, and the kneaded substance discharged through the outlet was cooled, thereby obtaining a phenolic resin composition C (with an adduct-forming percentage of hexamethylenetetramine of 56% and a content of free phenol of 0.6%) having a solid form at room temperature.

Example 1-4

The high-ortho novolac phenolic resin A (400 parts), the novolac resorcinol resin E (600 parts), and hexamethylenetetramine (100 parts) were injected into a pressure kneader, were heated to 90° C., and were dissolved for ten minutes. A phenolic resin composition D (with an adduct-forming percentage of hexamethylenetetramine of 32% and a content of free phenol of 0.2%) having a solid form at room temperature was obtained.

Example 1-5

The high-ortho novolac phenolic resin B (950 parts), the novolac resorcinol resin E (50 parts), and hexamethylenetetramine (120 parts) were prepared in a grinder mill and were grinded and mixed together, thereby obtaining a powder-form phenolic resin composition E (with an adduct-forming percentage of hexamethylenetetramine of 0% and a content of free phenol of 0.6%).

Example 1-6

The high-ortho novolac phenolic resin A (500 parts), the novolac resorcinol resin E (500 parts), and hexamethylenetetramine (140 parts) were supplied to a biaxial extruder controlled to have an inlet temperature of 85° C. and an outlet temperature of 95° C. so that the supply ratios thereof per unit time became equal, and the kneaded substance discharged through the outlet was cooled, thereby obtaining a phenolic resin composition F (with an adduct-forming percentage of hexamethylenetetramine of 43% and a content of free phenol of 0.3%) having a solid form at room temperature.

Comparative Example 1-1

The high-ortho novolac phenolic resin A (1,000 parts) and hexamethylenetetramine (130 parts) were supplied to a biaxial extruder controlled to have an inlet temperature of 80° C. and an outlet temperature of 90° C. so that the supply ratios thereof per unit time became equal, and the kneaded substance discharged through the outlet was cooled, thereby obtaining a phenolic resin composition G (with an adduct-forming percentage of hexamethylenetetramine of 45% and a content of free phenol of 0.5%) having a solid form at room temperature.

Comparative Example 1-2

The high-ortho novolac phenolic resin C (1,000 parts) and hexamethylenetetramine (150 parts) were prepared in a grinder mill and were grinded and mixed together, thereby obtaining a powder-form phenolic resin composition H (with an adduct-forming percentage of hexamethylenetetramine of 0% and a content of free phenol of 0.6%).

Comparative Example 1-3

The novolac phenolic resin D (1,000 parts) and hexamethylenetetramine (150 parts) were prepared in a grinder mill and were grinded and mixed together, thereby obtaining a powder-form phenolic resin composition I (with an adduct-forming percentage of hexamethylenetetramine of 0% and a content of free phenol of 0.3%).

Comparative Example 1-4

The novolac phenolic resin D (800 parts), the novolac resorcinol resin E (200 parts), and hexamethylenetetramine (120 parts) were injected into a pressure kneader, were heated to 90° C., and were dissolved for ten minutes. A phenolic resin composition J (with an adduct-forming percentage of hexamethylenetetramine of 38% and a content of free phenol of 0.2%) having a solid format room temperature was obtained.

Comparative Example 1-5

The novolac resorcinol resin E (1,000 parts) and hexamethylenetetramine (150 parts) were injected into a pressure kneader, were heated to 90° C., and were dissolved for ten minutes. A phenolic resin composition K (with an adduct-forming percentage of hexamethylenetetramine of 40% and a content of free phenol of 0%) having a solid form at room temperature was obtained.

Method for Evaluating Phenolic Resin Compositions (1) Proportions of Adduct in the Total Amount of Hexamethylenetetramine (Adduct-Forming Percentage of Hexamethylenetetramine)

The adduct-forming percentages of the hexamethylenetetramine were obtained from the following equation. Meanwhile, in the following equation, A represents the mass of the entire hexamethylenetetramine which was obtained using the Kjeldahl method, and B represents the mass of hexamethylenetetramine extracted with ion-exchange water which was obtained using a titration method. In addition, in the measurement, the particle diameter of the specimen was set to be smaller than or equal to 150 µm.

$$\text{Adduct-forming percentage}=[(A-B)/A]\times 100(\%)$$

(2) Contents of Free Phenol

The contents of free phenol were computed by measuring the obtained phenolic resin compositions using a gas chromatograph "GC-2014" manufactured by Shimadzu Corporation and a column "DB-WAX" manufactured by Agilent Technologies.

TABLE 1

| Evaluations of phenolic resin | Examples | | | | | | Comparative Examples | | | | |
|---|---|---|---|---|---|---|---|---|---|---|---|
| compositions | 1-1 | 1-2 | 1-3 | 1-4 | 1-5 | 1-6 | 1-1 | 1-2 | 1-3 | 1-4 | 1-5 |
| Names of phenolic resin compositions | A | B | C | D | E | F | G | H | I | J | K |

TABLE 1-continued

| Evaluations of phenolic resin compositions | | | Examples | | | | | | Comparative Examples | | | | |
|---|---|---|---|---|---|---|---|---|---|---|---|---|---|
| | | | 1-1 | 1-2 | 1-3 | 1-4 | 1-5 | 1-6 | 1-1 | 1-2 | 1-3 | 1-4 | 1-5 |
| Formulation [parts by mass] | High-ortho novolac phenolic resin | A | 800 | | | 400 | | 500 | 1000 | | | | |
| | | B | | 900 | | | 950 | | | | | | |
| | | C | | | 950 | | | | | 1000 | | | |
| | Novolac phenolic resin | D | | | | | | | | | 1000 | 800 | |
| | Novolac resorcinol resin | E | 200 | 100 | 50 | 600 | 50 | 500 | | | | 200 | 1000 |
| | Hexamethyl-enetetramine | | 120 | 130 | 150 | 100 | 120 | 140 | 130 | 150 | 150 | 120 | 150 |
| Mixing method of mxing device | | | Biaxial extruder | Pressure kneader | Biaxial extruder | Pressure kneader | Grinding and mixing | Biaxial extruder | Biaxial extruder | Grinding and mixing | Grinding and mixing | Pressure kneader | Pressure kneader |
| Evaluation results | Adduct-forming percentage of hexamethyl-enetetramine | | 40% | 69% | 56% | 32% | 0% | 43% | 45% | 0% | 0% | 38% | 40% |
| | Content of free phenol | | 0.5% | 0.6% | 0.6% | 0.2% | 0.6% | 0.3% | 0.5% | 0.6% | 0.3% | 0.2% | 0.0% |

Examples 2-1 to 2-6 and Comparative Examples 2-1 to 2-5

Mixtures for friction materials were produced using the following method and were evaluated using an evaluation method described below. The results are summarized in Table 2.

Production of Mixtures for Friction Materials

The friction material phenolic resin compositions A to K obtained in Examples 1-1 to 1-6 and Comparative Examples 1-1 to 1-5 were used as binding materials, an aramid fiber (KEVLAR manufactured by DuPont) was used as a fibrous base material, and calcium carbonate (calcium carbonate manufactured by Sankyo Seifun Co., Ltd.) and barium sulfate (ground barite manufactured by Sakai Chemical Industry Co., Ltd.) were used as inorganic fillers, respectively. The components were prepared and mixed together in formulation proportions shown in Table 2, thereby producing mixtures for friction materials.

(Method for Evaluating Mixtures for Friction Materials)

(1) Shortest Molding Time (Curing Properties in Molding Stage)

The mixtures for friction materials obtained by preparing and mixing the components in the above-described formulation proportions were respectively molded using a thermal shaping press at 180° C. at a pressure of 30 MPa for molding times in a range of 60 seconds to 180 seconds at intervals of 10 seconds, and the shortest times in which molded products having a height of 90 mm, a width of 60 mm, and a thickness of 13 mm were obtained without swelling and cracking while or after being removed from molds were considered as the shortest molding times. As the shortest molding time shortens, curing properties during molding were determined to be more favorable.

(2) Glass Transition Temperature Tg (Curing Properties in Baking Stage)

The mixtures for friction materials obtained by preparing and mixing the components in the above-described formulation proportions were molded using a thermal shaping press at 180° C. at a pressure of MPa for three minutes, thereby obtaining test specimens for measuring glass transition temperatures. For the obtained test specimens (before a baking treatment) and test specimens obtained by carrying out the baking treatment on the test specimens in a dryer having a temperature adjusted to be 250° C. for ten minutes, the glass transition temperatures Tg were measured in a bending mode of dynamic viscoelastic measurement (DMA). The glass transition temperatures Tg were obtained by extrapolating temperatures at which storage elastic moduli decreased. When the crosslinking densities (the degrees of cure) increased in spite of short baking times, and the glass transition temperatures Tg increased, the glass transition temperatures were determined to be more favorable.

(3) Bending Strength

The mixtures for friction materials obtained by preparing and mixing the components in the above-described formulation proportions were molded using a thermal shaping press at 170° C. at a pressure of MPa for seven minutes and then baked at 200° C. for 60 minutes, thereby obtaining bending test specimens. The obtained bending test specimens were measured according to JIS K 7171 "Plastics-Determination of flexural properties". Bending strengths measured at normal temperature (25° C.) after baking were considered as strengths at normal condition, and bending strengths measured at normal temperature (25° C.) after baking and then, furthermore, a heating treatment at 350° C. for four hours were considered as strengths after thermal treatment. As the bending strengths after thermal treatment increases, the mixtures for friction materials do not easily thermally deteriorate and are determined to have excellent heat resistance.

(4) Rockwell Hardness

The bending test specimens obtained using the above-described method were measured at normal temperature (25° C.) after baking according to JIS K 7202 "Method Of Rockwell Hardness Test For Plastics". As Rockwell hardness increases, the mixtures for friction materials have superior degrees of crosslinking and are determined to have excellent mechanical characteristics.

(5) Evaluation of Short Molding at High Temperature

The mixtures for friction materials obtained by preparing and mixing the components in the above-described formulation proportions were molded using a thermal shaping press at 180° C. at a pressure of MPa for two minutes so as to obtain molded products having a height of 90 mm, a width of 60 mm, and a thickness of 13 mm, and whether or not swelling and cracking occurred was checked. Mixtures for friction materials in which neither swelling nor cracking occurred were denoted as AA, mixtures for friction materials in which either swelling or cracking occurred were denoted as B, and mixtures for friction materials in which both swelling and cracking occurred were denoted as C.

Next, a baking treatment was carried out at 250° C. for 20 minutes while the temperatures of the molded products remained at 100° C. or higher, and whether or not swelling and cracking occurred was checked. Mixtures for friction materials in which neither swelling nor cracking occurred were denoted as AA, and mixtures for friction materials in which either swelling or cracking slightly occurred were denoted as A. On mixture for friction materials in which defects were caused after the molding, the baking treatment was not carried out.

molding (before the baking treatment) became close to the molding temperatures and the glass transition temperatures after the baking treatment also became close to the baking temperatures.

In addition, as shown in Table 2, regarding the bending strength (the strength after the thermal treatment) measured at normal temperature (25° C.) after the thermal treatment at 350° C. for four hours, when the molded products of the mixtures for friction materials of Examples 2-1 to 2-6 were compared with the molded products of the mixtures for friction materials of Comparative Examples 2-1 and 2-2, it was found that the strengths after the thermal treatment were high and excellent heat resistance was exhibited.

TABLE 2

| | | Examples | | | | | | Comparative Examples | | | | |
|---|---|---|---|---|---|---|---|---|---|---|---|---|
| Evaluations of mixtures for friction materials | | 2-1 | 2-2 | 2-3 | 2-4 | 2-5 | 2-6 | 2-1 | 2-2 | 2-3 | 2-4 | 2-5 |
| Formulation [parts by mass] | Phenolic resin composition | A | B | C | D | E | F | G | H | I | J | K |
| | | 10 | 10 | 10 | 10 | 10 | 10 | 10 | 10 | 10 | 10 | 10 |
| | Aramid fiber | 5 | 5 | 5 | 5 | 5 | 5 | 5 | 5 | 5 | 5 | 5 |
| | Calcium carbonate | 45 | 45 | 45 | 45 | 45 | 45 | 45 | 45 | 45 | 45 | 45 |
| | Barium sulfate | 40 | 40 | 40 | 40 | 40 | 40 | 40 | 40 | 40 | 40 | 40 |
| Evaluation results | Shortest molding time [seconds] | 80 | 80 | 80 | 100 | 100 | 80 | 130 | 140 | 180 | 170 | Not moldable |
| | Glass transition temperature [° C.] Before baking treatment | 178 | 177 | 176 | 169 | 171 | 174 | 167 | 162 | 155 | 156 | — |
| | After treatment at 250° C. for ten minutes | 241 | 237 | 234 | 212 | 223 | 232 | 208 | 216 | 203 | 205 | — |
| | Bending strength [MPa] Strengths at normal condition | 24 | 22 | 23 | 18 | 20 | 21 | 16 | 14 | 21 | 21 | — |
| | Strength after thermal treatment (350° C., four hours) | 13 | 11 | 11 | 7 | 8 | 10 | 5 | 4 | 10 | 10 | — |
| | Hardness Rockwell hardness [HR-M] | 78 | 74 | 76 | 63 | 62 | 75 | 58 | 55 | 71 | 73 | — |
| Evaluation of short molding at high temperature | Appearance after short molding at high temperature | AA | AA | AA | AA | AA | AA | B | C | C | C | — |
| | Appearance after baking | AA | AA | AA | A | A | AA | — | — | — | — | — |

As shown in Table 2, regarding the curing properties in the molding stage, when the molded products of the mixtures for friction materials of Examples 2-1 to 2-6 which were mixtures for friction materials for which the phenolic resin compositions for friction materials of Examples 1-1 to 1-6 were used were compared with Comparative Examples 2-1 to 2-4 which were the molded products of the mixtures for friction materials for which the phenolic resin compositions for friction materials of Comparative Example 1-1 in which the novolac resorcinol resin was not used, Comparative Example 1-2 in which the novolac resorcinol resin was not used and no adducts were formed, Comparative Example 1-3 in which the high-ortho novolac phenolic resin and the novolac resorcinol resin were not used, and Comparative Example 1-4 in which the novolac phenolic resin was used instead of the high-ortho novolac phenolic resin were used, it was found that the shortest molding times were short and the curing properties in the molding stage were excellent. In addition, Comparative Example 2-5 which was a molded product of a mixture for friction materials for which the phenolic resin composition for friction materials of Comparative Example 1-5 in which the high-ortho novolac phenolic resin was not used and only the novolac resorcinol resin was used were used could not be molded.

In addition, as shown in Table 2, regarding the curing properties in the baking stage, when the molded products of the mixtures for friction materials of Examples 2-1 to 2-6 were compared with the molded products of the mixtures for friction materials of Comparative Examples 2-1 to 2-4, it was found that the glass transition temperatures after the In addition, as shown in Table 2, regarding the Rockwell hardness, when the molded products of the mixtures for friction materials of Examples 2-1 to 2-6 were compared with the molded products of the mixtures for friction materials of Comparative Examples 2-1 and 2-2, it was found that the hardness was high and excellent degrees of crosslinking were exhibited.

Furthermore, as shown in Table 2, regarding the appearance after short molding at a high temperature, when the molded products of the mixtures for friction materials of Examples 2-1 to 2-6 were compared with the molded products of the mixtures for friction materials of Comparative Examples 2-1 to 2-4, it was found that the appearances after short shaping at a high temperature were excellent. Furthermore, in the molded products of the mixtures for friction materials of Examples 2-1 to 2-3 and 2-6, neither swelling nor cracking occurred even after the baking treatment was subsequently carried out at 250° C. for 20 minutes, and favorable results were obtained.

The above-described results show that the mixtures for friction materials for which the phenolic resin composition for friction materials of the present invention is used are capable of shortening the curing time. In addition, the molded products including the mixture for friction materials for which the phenolic resin composition for friction materials of the present invention is used had high hardness and exhibited excellent heat resistance. In addition, it was found that, in the mixtures for friction materials for which the phenolic resin composition for friction materials of the present invention is used, neither cracking nor swelling occurred after the short molding at a high temperature, and the mixtures also can be applied to short molding at a high temperature. Therefore, according to the present invention, it is possible to obtain a phenolic resin composition for friction materials capable of providing friction materials having excellent heat resistance at low costs without a variety of characteristics such as mechanical characteristics deteriorating. In addition, according to the present invention, it is possible to obtain a phenolic resin composition for friction materials that also can be applied to short molding at a high temperature.

INDUSTRIAL APPLICABILITY

The phenolic resin composition for friction materials of the present invention is capable of reaching a high degree of cure even when the curing time is shortened, whereby friction materials having excellent heat resistance can be obtained at a low cost without a variety of characteristics such as mechanical characteristics deteriorating and thus can be preferably used to manufacture, for example, industrial friction materials such as brakes.

The present application claims priority on the basis of Japanese Patent Application No. 2014-022070 filed on Feb. 7, 2014, the content of which is incorporated herein.

The invention claimed is:

1. A phenolic resin composition for friction materials comprising:
   a high-ortho novolac phenolic resin;
   a novolac resorcinol resin; and
   hexamethylenetetramine.

2. The phenolic resin composition for friction materials according to claim 1,
   wherein a content of the novolac resorcinol resin is greater than or equal to 1 part by mass and less than or equal to 100 parts by mass with respect to 100 parts by mass of the high-ortho novolac phenolic resin.

3. The phenolic resin composition for friction materials according to claim 1,
   wherein the high-ortho novolac phenolic resin has an ortho/para bonding ratio of higher than or equal to 1 and lower than or equal to 9.

4. The phenolic resin composition for friction materials according to claim 1,
   wherein the high-ortho novolac phenolic resin has a weight-average molecular weight of greater than or equal to 1,000 and less than or equal to 8,000.

5. The phenolic resin composition for friction materials according to claim 1,
   wherein a content of free phenol is lower than 1% by mass with respect to the total amount of the high-ortho novolac phenolic resin.

6. The phenolic resin composition for friction materials according to claim 1,
   wherein, when the total amount of the high-ortho novolac phenolic resin and the novolac resorcinol resin is set to 100 parts by mass,
   a content of the hexamethylenetetramine is higher than or equal to 5 parts by mass and lower than or equal to 20 parts by mass with respect to the total 100 parts by mass of the high-ortho novolac phenolic resin and the novolac resorcinol resin.

7. The phenolic resin composition for friction materials according to claim 1,
   wherein the phenolic resin composition for friction materials includes an adduct of the hexamethylenetetramine with the high-ortho novolac phenolic resin.

8. The phenolic resin composition for friction materials according to claim 7,
   wherein the amount of the hexamethylenetetramine forming the adduct is greater than or equal to 30% with respect to the total amount of the hexamethylenetetramine included in the phenolic resin composition for friction materials.

9. The phenolic resin composition for friction materials according to claim 1,
   wherein the phenolic resin composition for friction materials is obtained by melting and mixing the high-ortho novolac phenolic resin, the novolac resorcinol resin, and the hexamethylenetetramine.

10. The phenolic resin composition for friction materials according to claim 9,
    wherein the phenolic resin composition for friction materials is obtained by melting and mixing a resin mixture of the high-ortho novolac phenolic resin and the novolac resorcinol resin and the hexamethylenetetramine.

11. A friction material comprising:
    a fibrous base material;
    a filler; and
    a binding material,
    wherein the binding material includes the phenolic resin composition for friction materials according to claim 1.

12. The friction material according to claim 11,
    wherein the fibrous base material includes an organic fiber.

13. The friction material according to claim 11,
    wherein the filler includes an inorganic filler.

14. A brake formed using the friction material according to claim 11.

* * * * *